US009570931B2

(12) United States Patent
Katsumata et al.

(10) Patent No.: US 9,570,931 B2
(45) Date of Patent: Feb. 14, 2017

(54) ELECTRONIC DEVICE AND ELECTRONIC DEVICE CHARGING SYSTEM

(71) Applicant: PANASONIC INTELLECTUAL PROPERTY CORPORATION OF AMERICA, Torrance, CA (US)

(72) Inventors: Tomoki Katsumata, Kanagawa (JP); Yuichiro Yamashita, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 287 days.

(21) Appl. No.: 14/367,441

(22) PCT Filed: Nov. 27, 2012

(86) PCT No.: PCT/JP2012/007603
§ 371 (c)(1),
(2) Date: Jun. 20, 2014

(87) PCT Pub. No.: WO2013/094126
PCT Pub. Date: Jun. 27, 2013

(65) Prior Publication Data
US 2015/0048786 A1    Feb. 19, 2015

(30) Foreign Application Priority Data
Dec. 22, 2011  (JP) ................................ 2011-281706

(51) Int. Cl.
*H02J 7/00* (2006.01)
*H01M 10/44* (2006.01)
(Continued)

(52) U.S. Cl.
CPC .............. *H02J 7/007* (2013.01); *H01M 10/44* (2013.01); *H02J 7/0086* (2013.01); *H02J 7/025* (2013.01);
(Continued)

(58) Field of Classification Search
CPC ....................................................... H02J 7/025
(Continued)

(56) References Cited

U.S. PATENT DOCUMENTS

2008/0252254 A1* 10/2008 Osada ............... H01M 10/0436
320/108
2010/0019718 A1* 1/2010 Salasoo ................ B60L 3/0046
320/103
(Continued)

FOREIGN PATENT DOCUMENTS

JP           8-45550 A    2/1996
JP        2010-35417 A    2/2010
(Continued)

OTHER PUBLICATIONS

International Search Report dated Feb. 12, 2013, for corresponding International Application No. PCT/JP2012/007603, 3 pages.

*Primary Examiner* — Suresh Memula
(74) *Attorney, Agent, or Firm* — Seed IP Law Group LLP

(57) ABSTRACT

An electronic device includes a power receiving unit and a secondary battery. The electronic device can send an instruction to an outside to stop power transmission, and operates by a discharge current of the secondary battery. In a case where the secondary battery is charged and a voltage of the secondary battery becomes higher than a first threshold and lower than a second threshold larger than the first threshold, charging of the secondary battery is stopped without sending the instruction to stop the power transmission, and after an elapse of a predetermined period of time, the charging of the secondary battery is restarted. When the voltage of the secondary battery thereafter becomes higher than the second threshold, the instruction to stop the power transmission is sent, and the charging of the secondary battery is stopped.

9 Claims, 3 Drawing Sheets

(51) Int. Cl.
*H02J 17/00* (2006.01)
*H02J 7/02* (2016.01)

(52) U.S. Cl.
CPC ............... *H02J 17/00* (2013.01); *H02J 50/80* (2016.02); *H02J 7/0091* (2013.01); *H02J 2007/0098* (2013.01)

(58) Field of Classification Search
USPC ........................................................ 320/108
See application file for complete search history.

(56) References Cited

U.S. PATENT DOCUMENTS

| | | | |
|---|---|---|---|
| 2010/0066305 A1 | 3/2010 | Takahashi et al. | |
| 2012/0176082 A1* | 7/2012 | Lee | B60L 1/02 320/103 |
| 2012/0290236 A1 | 11/2012 | Majima | |
| 2013/0127398 A1* | 5/2013 | Xu | H02J 7/0072 320/103 |

FOREIGN PATENT DOCUMENTS

| | | |
|---|---|---|
| JP | 2011-53088 A | 3/2011 |
| JP | 2011-169817 A | 9/2011 |

* cited by examiner

ELECTRONIC DEVICE AND ELECTRONIC DEVICE CHARGING SYSTEM

TECHNICAL FIELD

The present invention relates to an electronic device including a wireless charging function which wirelessly receives electric power and which charges a secondary battery based on the received electric power, and also relates to an electronic device charging system including the electronic device and a charger including a power transmitting function which wirelessly transmits electric power to the electronic device.

BACKGROUND ART

Among electronic devices using a secondary battery, there are electronic devices including a function of detecting the remaining battery capacity. In order to detect the remaining capacity of a secondary battery, it is necessary to detect the terminal voltage in a no-load condition (such a voltage is called "OCV (Open Circuit Voltage)"). Patent Document 1 describes a calculation method for obtaining the remaining capacity of a secondary battery. In the secondary battery remaining capacity calculation method described in Patent Document 1, when the relative remaining capacity SOC of a secondary battery is to be obtained from the open circuit voltage OCV of the secondary battery with reference to a table which shows previously obtained relationships between the open circuit voltage of the secondary battery and the relative remaining capacity [%], an open circuit voltage OCVfull in the full-charge condition of the secondary battery is detected, a relative remaining capacity SOCfull [%] is obtained with reference to the table in accordance with the open circuit voltage OCVfull, and the relative remaining capacity SOC which is obtained with reference to the table in accordance with the open circuit voltage OCV of the secondary battery that is detected when the discharge of the secondary battery is stopped is then corrected by SOCtrue=SOC×(100/SOCfull) based on the relative remaining capacity SOCfull [%] in the full-charge condition, thereby obtaining the true relative remaining capacity SOCtrue of the secondary battery.

RELATED ART DOCUMENTS

Patent Documents

Patent Document 1: JP-A-2011-053088

SUMMARY OF THE INVENTION

Problem to be Solved by the Invention

In an electronic device including a wireless charging function, when placed on a charger which is to transmit electric power, wireless charging is started. When the OCV is to be measured during the wireless charging, the charging is stopped, and the power transmission of the charger is stopped. When no countermeasure is taken, the charging cannot be restarted. In order to restart charging, the contact detection on the side of the electronic device is necessary (namely, an operation is required in which the electronic device is once separated from a table of the charger, and the device is then again placed on the table). As described above, there is a problem in that, after measurement of the OCV, charging cannot be restarted unless the contact detection on the side of the electronic device is performed.

The invention has been made in view of the above-described circumstances, and an object thereof is to provide an electronic device and electronic device charging system in which, after measurement of the OCV, charging can be restarted without the contact detection on the side of the electronic device.

Means for Solving the Problem

According to the invention, there is provided an electronic device including: a power receiving unit which receives electric power; and a secondary battery which is to be charged based on the electric power received by the power receiving unit, wherein the electronic device is capable of sending an instruction to an outside to stop power transmission, and operates by a discharge current of the secondary battery, wherein in a case where the secondary battery is charged and a voltage of the secondary battery becomes higher than a predetermined threshold, charging of the secondary battery is stopped without sending the instruction to stop the power transmission, and after an elapse of a predetermined period of time, the charging of the secondary battery is restarted.

According to the configuration, during the period of time from the stopping of the charging of the secondary battery to the restarting, the OCV can be measured. Since stopping of the power transmission is not instructed, charging can be restarted without the contact detection on the side of the electronic device.

In the configuration, in the case where the secondary battery is charged and the voltage of the secondary battery becomes higher than the predetermined threshold, the charging of the secondary battery is stopped without sending the instruction to stop the power transmission, the discharge current of the secondary battery is set to be equal to or smaller than a predetermined current level, and the charging of the secondary battery is restarted after the elapse of the predetermined period of time.

According to the configuration, since the discharge current of the secondary battery is reduced, the load during the OCV measurement is lowered, and the accuracy of the OCV measurement is improved. When a CPU (Central Processing Unit) is put into a sleep state, for example, the discharge current of the secondary battery can be reduced.

In the configuration, in the case where the secondary battery is charged and the voltage of the secondary battery becomes higher than the predetermined threshold, the charging of the secondary battery is stopped without sending the instruction to stop the power transmission, the discharge current of the secondary battery is set to be equal to or smaller than a predetermined current level, and after the elapse of the predetermined period of time, the charging of the secondary battery is restarted, and setting the discharge current of the secondary battery to be equal to or smaller than the predetermined current level is stopped.

According to the configuration, after an elapse of the predetermined period of time from the stopping of the charging of the secondary battery, the setting of the discharge current of the secondary battery to be equal to or smaller than the predetermined current level is stopped, and hence the state where charging can be restarted is thereafter attained, so that the secondary battery can be normally charged.

In the configuration, in a case where the predetermined threshold is a first threshold, and in a case where the secondary battery is charged and the voltage of the secondary battery is higher than the first threshold and lower than a second threshold which is larger than the first threshold, the charging of the secondary battery is stopped without sending the instruction to stop the power transmission, the charging of the secondary battery is restarted after the elapse of the predetermined period of time, and when the voltage of the secondary battery thereafter becomes higher than the second threshold, the instruction to stop the power transmission is sent.

According to the configuration, in the case where the voltage of the secondary battery is higher than the first threshold, and lower than the second threshold which is larger than the first threshold, the OCV can be measured, and, when the voltage of the secondary battery thereafter becomes higher than the second threshold, the charging can be completed.

In the configuration, in the case where the secondary battery is charged and the voltage of the secondary battery is higher than the first threshold and lower than the second threshold which is larger than the first threshold, the charging of the secondary battery is stopped without sending the instruction to stop the power transmission, the charging of the secondary battery is restarted after the elapse of the predetermined period of time, and when the voltage of the secondary battery thereafter becomes higher than the second threshold, the instruction to stop the power transmission is sent, and the charging of the secondary battery is stopped.

According to the configuration, the OCV can be measured during the period of time from the stopping of the charging of the secondary battery to the restarting, and, when the full-charge condition is then attained, the charging can be automatically stopped.

In the configuration, the power receiving unit includes an electromagnetic coil.

In the configuration, the instruction to stop the power transmission is sent through the power receiving unit.

According to the invention, there is provided an electronic device charging system of the invention including: a charger which includes a power transmitting unit that transmits electric power, and which is capable of stopping the power transmission in accordance with an external instruction to stop the power transmission; and any one of the above-described electronic device.

According to the configuration, the electronic device can measure the OCV during the period of time from the stopping of the charging of the secondary battery to the restarting. Moreover, the electronic device does not instruct the charger to stop the power transmission, and therefore charging can be restarted without the contact detection on the side of the electronic device.

In the configuration, the power transmitting unit includes an electromagnetic coil.

In the configuration, the charger receives a supply of electric power from an external commercial power supply.

According to the invention, there is provided a charging stop/restart method available for an electronic device including: a power receiving unit which receives electric power, and a secondary battery which is to be charged based on the electric power received by the power receiving unit, wherein the electronic device is capable of sending an instruction to an outside to stop power transmission, and operates by a discharge current of the secondary battery, the method including: stopping charging of the secondary battery without sending the instruction to stop the power transmission in a case where the secondary battery is charged and a voltage of the secondary battery becomes higher than a predetermined threshold; and restarting the charging of the secondary battery after an elapse of a predetermined period of time.

According to the method, during the period of time from the stopping of the charging of the secondary battery to the restarting, the OCV can be measured. Since stopping of the power transmission is not instructed, charging can be restarted without the contact detection on the side of the electronic device.

Advantages of the Invention

According to the invention, in an electronic device including a wireless charging function which wirelessly receives electric power, and which charges a secondary battery based on the received electric power, after measurement of the OCV, charging can be restarted without the contact detection on the side of the electronic device.

MODE FOR CARRYING OUT THE INVENTION

Hereinafter, a preferred embodiment for implementing the invention will be described in detail with reference to the drawings.

Figure 1:
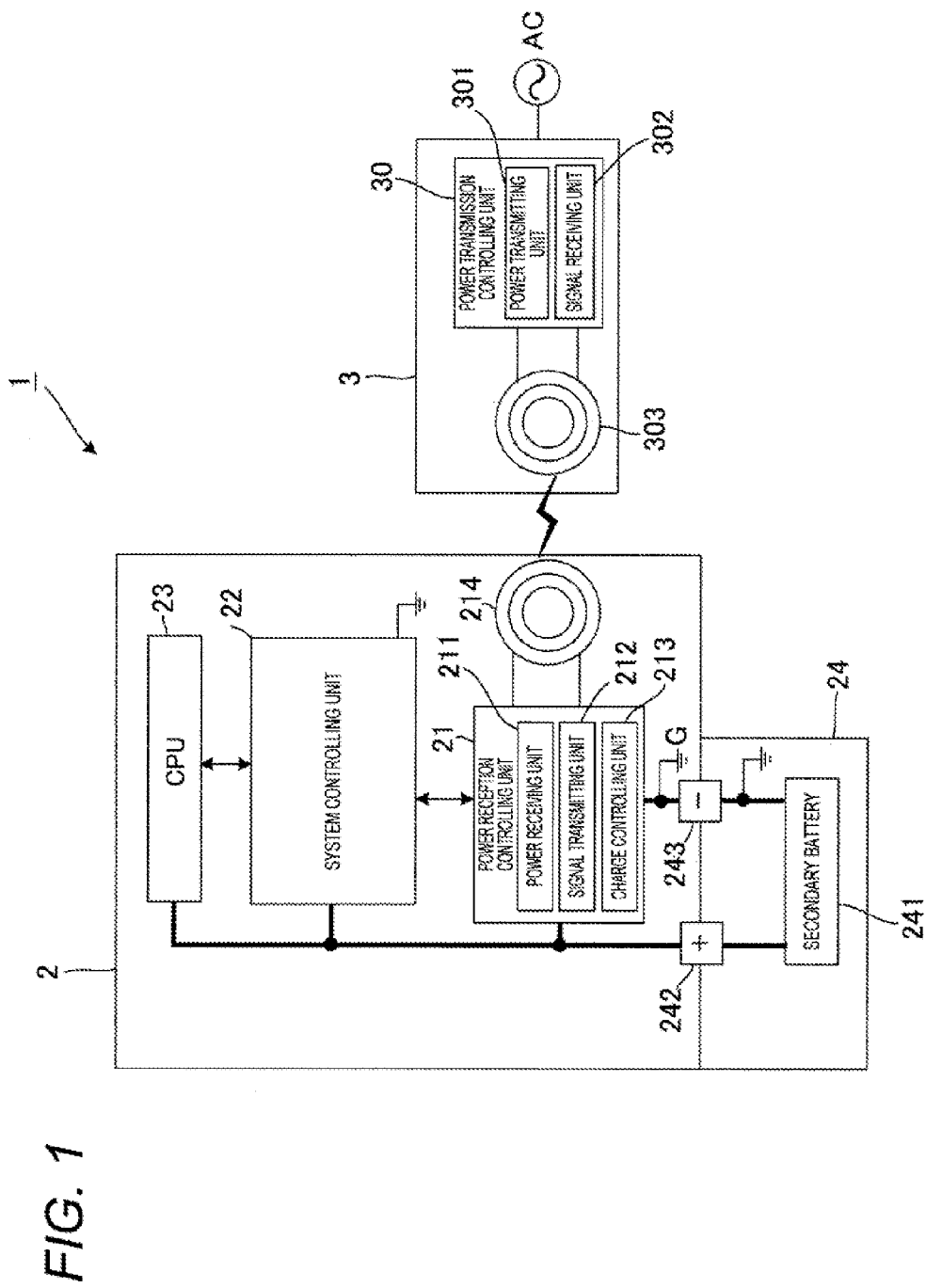
FIG. 1 is a block diagram schematically showing the configuration of an electronic device charging system of an embodiment of the invention.

FIG. 1 is a block diagram schematically showing the configuration of an electronic device charging system of an embodiment of the invention. In the figure, the electronic device charging system 1 of the embodiment includes an electronic device 2 and a charger 3. The electronic device 2 includes a wireless charging function which wirelessly receives electric power, and which charges a secondary battery based on the received electric power. The charger 3 is a charging table which is called a cradle, and includes a power transmitting function which produces electric power to be supplied to the electronic device 2, from an AC power supply (commercial power supply) AC, and which wirelessly transmits the power to the electronic device 2.

The electronic device 2 includes a system controlling unit 22, a CPU 23, a power reception controlling unit 21, and a battery pack 24 which supplies electric power to various units of the device. The system controlling unit 22 outputs instructions for starting and stopping power transmission, and the like, to the power reception controlling unit 21, and instructions for putting the CPU 23 into a sleep state, or activating the CPU, to the CPU 23.

The power reception controlling unit 21 includes: a power receiving unit 211 which wirelessly receives electric power; a signal transmitting unit 212 which transmits a power transmission start signal and a power transmission stop signal to the charger 3; and a charge controlling unit 213 which controls the charging. The power receiving unit 211 has an electromagnetic coil 214, and receives electric power which is transmitted from a power transmitting unit 301 of the charger 3, by electromagnetic induction with an electromagnetic coil 303 of the power transmitting unit 301 of the charger 3. Upon receiving instructions for starting power transmission from the system controlling unit 22, the signal transmitting unit 212 transmits the power transmission start signal to the charger 3 by using the electromagnetic coil 214 as an antenna. The charge controlling unit 213 controls the charging of a secondary battery 241 incorporated in the battery pack 24. The charge controlling unit 213 detects the voltage of the secondary battery 241 in the charge control of the secondary battery 241, and outputs a result of the detection to the system controlling unit 22. The system controlling unit 22 determines whether the secondary battery 241 is in the full-charge condition or not, based on the voltage of the secondary battery 241 which is detected by the charge controlling unit 213, and, if it is determined that the battery is in the full-charge condition, outputs instructions for stopping the power transmission.

The battery pack 24 is connected through a + terminal 242 to the + power supply sides of the power reception controlling unit 21, the system controlling unit 22, and the CPU 23, and through a − terminal 243 to the ground G of the electronic device 2 and the—power supply side of the power reception controlling unit 21. The secondary battery 241 incorporated in the battery pack 24 is charged by electric power which is transmitted from the charger 3 by the power reception controlling unit 21.

The charger 3 includes a power transmission controlling unit 30. The power transmission controlling unit 30 includes the power transmitting unit 301 which wirelessly transmits electric power, and a signal receiving unit 302 which receives the power transmission start signal, power transmission stop signal, and the like that are transmitted from the electronic device 2. The power transmitting unit 301 has the electromagnetic coil 303, and transmits electric power by electromagnetic induction between the electromagnetic coil 303 and the electromagnetic coil 214 of the power receiving unit 211 of the electronic device 2. The signal receiving unit 302 receives the power transmission start signal and power transmission stop signal which are transmitted from the signal transmitting unit 212 of the electronic device 212, by using the electromagnetic coil 303 as an antenna. When the signal receiving unit 302 receives the power transmission start signal, the power transmission controlling unit 30 starts transmission of electric power from the power transmitting unit 301, and, when the signal receiving unit 302 receives the power transmission stop signal, stops the transmission of electric power from the power transmitting unit 301. Since the electromagnetic coils 214, 303 are used in the transmission and reception of instructions for starting and stopping power transmission, dedicated antennas are not required, and therefore the cost and the size of the device can be correspondingly reduced.

Next, the operation of the electronic device charging system 1 of the embodiment will be described.

Figure 2:
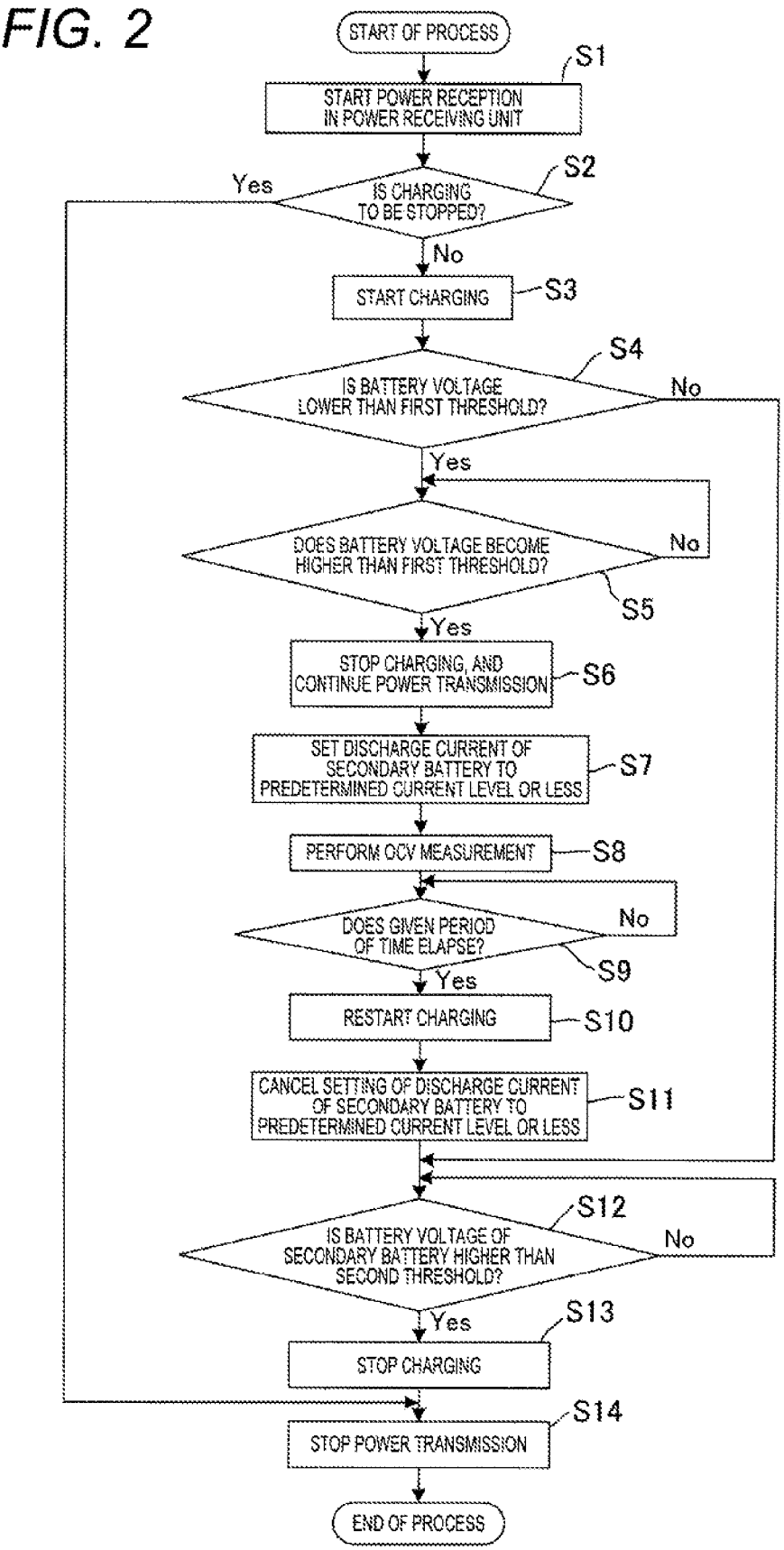
FIG. 2 is a flowchart illustrating the operation of an electronic device of the electronic device charging system of FIG. 1.

FIG. 2 is a flowchart illustrating the operation of the electronic device 2. Referring to the figure, the system controlling unit 22 starts power reception (step S1). Namely, the system controlling unit 22 outputs instructions for starting power reception to the power reception controlling unit 21. In the power reception controlling unit 21 which receives the instructions for starting power reception, the power receiving unit 211 starts power reception. After starting power reception, the system controlling unit 22 determines whether the charging is to be stopped or not (step S2). Namely, the system controlling unit 22 determines whether the charging is to be stopped or not, in accordance with the state of the electronic device 2. When a temperature abnormality occurs in the electronic device 2, for example, it is determined that the charging is to be stopped.

If it is determined that, for example, a temperature abnormality occurs in the electronic device 2 and the charging is to be stopped (namely, if "Yes" is determined in the determination of step S2), the system controlling unit 22 outputs instructions for stopping power transmission to the power reception controlling unit 21 (step S14). When receiving the instructions for stopping power transmission, the power reception controlling unit 21 transmits the power transmission stop signal to the charger 3. As a result, the power transmission from the charger 3 is stopped.

If it is determined in the determination of step S2 that the charging is not stopped (namely, if "No" is determined in the determination of step S2), the system controlling unit 22 starts charging (step S3). Namely, the system controlling unit 22 outputs instructions for starting charging to the power reception controlling unit 21. In the power reception controlling unit 21, when receiving the instructions for starting charging, the charge controlling unit 213 starts charging of the secondary battery 241. Of course, the electric power which is used in the charging is the power transmitted from the charger 3. After starting charging, the system controlling unit 22 determines whether the voltage of the secondary battery 241 is lower than a first threshold or not (step S4). If the voltage of the secondary battery 241 is higher than the first threshold (namely, if "No" is determined in the determination of step S4), it is determined whether the voltage of the secondary battery 241 is higher than a second threshold or not (step S12). If the voltage is not higher than the second threshold, this determination is repeated until the voltage becomes higher than the second threshold, and, if the voltage is higher than the second threshold, the instructions for stopping charging are output to the power reception controlling unit 21 (step S13). In the power reception controlling unit 21, when receiving the instructions for stopping charging, the charge controlling unit 213 stops the charging of the secondary battery 241. After outputting the instructions for stopping charging to the power reception controlling unit 21, the system controlling unit 22 outputs instructions for stopping power transmission to the power reception controlling unit 21 (step S14), and terminates this process.

If it is determined in the determination of step S4 that the voltage of the secondary battery 241 is lower than the first threshold (namely, if "Yes" is determined in the determination of step S4), the system controlling unit 22 determines whether the voltage of the secondary battery 241 becomes higher than the first threshold or not (step S5). If it is determined in the determination that the voltage of the secondary battery 241 does not become higher than the first threshold (namely, if "No" is determined in the determination of step S5), this determination is repeated until the voltage of the secondary battery 241 becomes higher than the first threshold. By contrast, if it is determined that the voltage of the secondary battery 241 becomes higher than the first voltage (namely, if "Yes" is determined in the determination of step S5), the power transmission from the charger 3 is continued, but the charging of the secondary battery 241 is stopped. Namely, the system controlling unit 22 outputs only the instructions for stopping the charging to the power reception controlling unit 21, and does not output instructions for transmitting the power transmission stop signal. Therefore, the charging of the secondary battery 241 is stopped, but the power transmission from the charger 3 is continued.

After the system controlling unit 22 performs the control for stopping the charging and continuing the power transmission, the system controlling section 22 puts the CPU 23 into a sleep state in order to set the discharge current of the secondary battery 241 to be equal to or smaller than a predetermined current (step S7). Namely, the CPU 23 is put into a sleep state to reduce the load. After the discharge current of the secondary battery 241 is set to be equal to or smaller than the predetermined current, the OCV is measured (step SB). In this case, the CPU 23 is put into a sleep state to reduce the load, and therefore the OCV can be accurately measured.

Then, the system controlling unit 22 determines whether a given period of time elapses after the measurement of the OCV is started or not (step S9). If the given period of time does not elapse (namely, if "No" is determined in the determination of step S9), this determination is repeated until the given period of time elapses. By contrast, if it is determined that the given period of time elapses (namely, if "Yes" is determined in the determination of step S9), charging is restarted (step S10). Namely, the system controlling unit 22 outputs instructions for starting charging to the power reception controlling unit 21 to restart charging of the secondary battery 241. In this case, the power transmission from the charger 3 is not stopped, and therefore it is not necessary to perform an operation of, also after the OCV is measured, once separating the electronic device 2 which has been placed on the charger 3, from the charger 3, and then again placing the device on the charger 3.

After charging is restarted, the system controlling unit 22 cancels the setting in which the discharge current of the secondary battery 241 is set to be equal to or smaller than the predetermined current (step S11). Namely, the CPU 23 is set from the sleep state to an activated state. After the limitation of the discharge current of the secondary battery 241 is cancelled, it is determined whether the battery voltage of the secondary battery 241 is higher than a second threshold or not (step S12). If the battery voltage of the secondary battery 241 is not higher than the second threshold (namely, if "No" is determined in the determination of step S12), this determination is repeated until the voltage becomes higher than the second threshold. By contrast, if it is determined that the battery voltage of the secondary battery 241 becomes higher than the second threshold (namely, if "Yes" is determined in the determination of step S12), the charging is stopped (step S13). Namely, the system controlling unit 22 outputs instructions for stopping charging to the power reception controlling unit 21 to stop the charging of the secondary battery 241 (step S13). Then, the power transmission is stopped in step S14, and this process is ended.

As described above, in the case where the battery voltage of the secondary battery 241 becomes higher than the first threshold. the system controlling unit 22 stops the charging of the secondary battery 241 while allowing the power transmission from the charger 3 to be continued, sets, after the charging is stopped, the CPU 23 to a sleep state to set the discharge current of the secondary battery 241 to be equal to or smaller than the predetermined current level, and, under this state, performs the OCV measurement. After the OCV is measured, the charging is restarted, charging is stopped when the battery voltage of the secondary battery 241 becomes higher than the second threshold, and the charger 3 is caused to stop the power transmission.

As described above, the electronic device charging system 1 of the embodiment includes: the electronic device 2 including the power reception controlling unit 21 which wirelessly receives electric power, and which charges the secondary battery 241 based on the received electric power, and the system controlling unit 22 which controls the power reception controlling unit 21; and the charger 3 including the power transmission controlling unit 30 which produces electric power to be supplied to the electronic device 2, from the AC power supply AC, and which wirelessly transmits the power to the electronic device 2. In the case where the battery voltage of the secondary battery 241 is higher than the first threshold, the system controlling unit 22 of the electronic device 2 stops the charging of the secondary battery 241 while allowing the power transmission from the charger 3 to be continued, sets thereafter the CPU 23 to a sleep state to set the discharge current of the secondary battery 241 to be equal to or smaller than the predetermined current level, and performs the OCV measurement. After the OCV is measured, charging is restarted, and, when the battery voltage of the secondary battery 241 becomes higher than the second threshold, the charging is stopped. Therefore, charging can be restarted without the contact detection on the side of the electronic device 2 (without performing an operation of once separating the electronic device 2 which has been placed on the charger 3, from the charger 3, and then again placing the device on the charger 3). In the OCV measurement, the CPU 23 is put into a sleep state to reduce the load of the secondary battery 241, and therefore the OCV measurement which is highly accurate is enabled.

Figure 3:
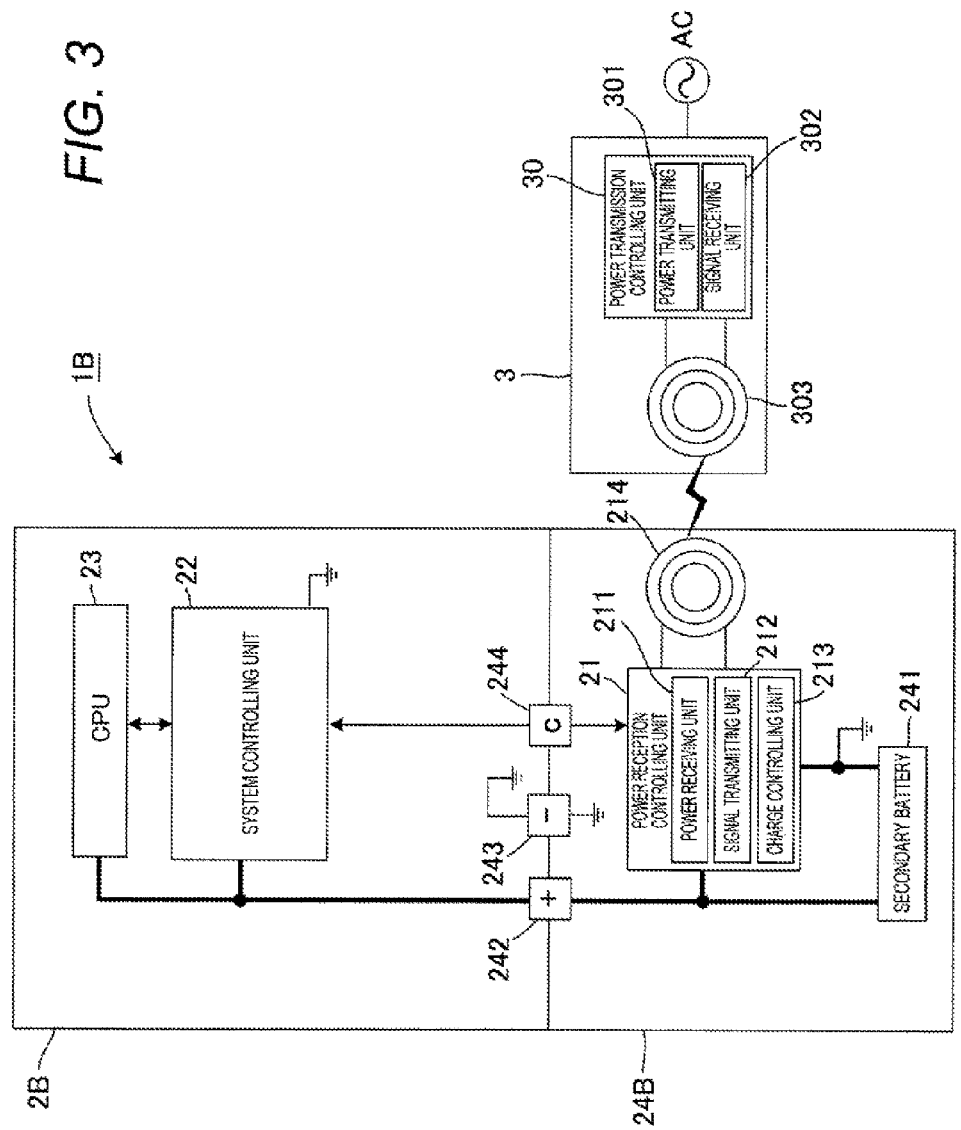
FIG. 3 is a block diagram schematically showing the configuration of an electronic device charging system which is a modification of the electronic device charging system of FIG. 1, and in which a power reception controlling unit is disposed in a battery pack.

In the electronic device charging system 1 of the embodiment, the power reception controlling unit 21 is disposed on the side of the electronic device 2. Alternatively, the power reception controlling unit 21 may be disposed on the side of the battery pack. FIG. 3 is a block diagram schematically showing the configuration of an electronic device charging system 1B which is a modification of the electronic device charging system 1 of FIG. 1, and in which the power reception controlling unit 21 is disposed in a battery pack. As shown in the figure, a battery pack 24B includes the power reception controlling unit 21. The power reception controlling unit 21 and the system controlling unit 22 of the electronic device 2B communicate with each other through a communication terminal 244.

Moreover, programs describing the processes in the electronic device 2 of the electronic device charging system 1 of the embodiment may be distributed while being stored in a storage medium such as a magnetic disk, an optical disk, a magnetooptical disk, or a semiconductor memory, or by using an electric communication line such as the Internet.

Although the invention has been described in detail and with reference to the specific embodiment, it is obvious to a person skilled in the art that various changes and modifications can be made without departing from the spirit and scope of the invention.

The application is based on Japanese Patent Application (No. 2011-281706) filed Dec. 22, 2011, and its disclosure is incorporated herein by reference.

INDUSTRIAL APPLICABILITY

The invention has an effect that, after measurement of the OCV charging can be restarted without the contact detection on the side of the electronic device, and can be applied to an electronic device including a wireless charging function.

DESCRIPTION OF REFERENCE SIGNS 1, 1B: Electronic Device Charging System
2, 2B: Electronic Device
3: Charger 21: Power Reception Controlling Unit
22: System Controlling Unit
23: CPU
24, 24B: Battery Pack
30: Power Transmission Controlling Unit
211: Power Receiving Unit
212: Signal Transmitting Unit
213: Charge Controlling Unit
214, 303: Electromagnetic Coil
241: Secondary Battery
242: + Terminal
243: − Terminal
244: Communication Terminal
301: Power Transmitting Unit
302: Signal Receiving Unit

The invention claimed is:

1. An electronic device comprising:
a power receiving unit which receives electric power; and
a secondary battery which is to be charged based on the electric power received by the power receiving unit,
wherein said electronic device is capable of sending an instruction to an outside to stop power transmission, and operates by a discharge current of the secondary battery,
wherein in a case where the secondary battery is charged and a voltage of the secondary battery becomes higher than a first threshold and lower than a second threshold which is larger than the first threshold, charging of the secondary battery is stopped without sending the instruction to stop the power transmission, and after an elapse of a predetermined period of time, the charging of the secondary battery is restarted, and
wherein when the voltage of the secondary battery thereafter becomes higher than the second threshold, the instruction to stop the power transmission is sent, and the charging of the secondary battery is stopped.

2. The electronic device according to claim 1,
wherein in the case where the secondary battery is charged and the voltage of the secondary battery becomes higher than the first threshold, the charging of the secondary battery is stopped without sending the instruction to stop the power transmission, the discharge current of the secondary battery is set to be equal to or smaller than a predetermined current level, and the charging of the secondary battery is restarted after the elapse of the predetermined period of time.

3. The electronic device according to claim 1,
wherein in the case where the secondary battery is charged and the voltage of the secondary battery becomes higher than the first threshold, the charging of the secondary battery is stopped without sending the instruction to stop the power transmission, the discharge current of the secondary battery is set to be equal to or smaller than a predetermined current level, and after the elapse of the predetermined period of time, the charging of the secondary battery is restarted, and setting the discharge current of the secondary battery to be equal to or smaller than the predetermined current level is stopped.

4. The electronic device according to claim 1,
wherein the power receiving unit comprises an electromagnetic coil.

5. The electronic device according to claim 1,
wherein the instruction to stop the power transmission is sent through the power receiving unit.

6. An electronic device charging system comprising:
a charger which comprises a power transmitting unit that transmits electric power, and which is capable of stopping the power transmission in accordance with an external instruction to stop the power transmission; and
an electronic device including:
a power receiving unit which receives electric power; and
a secondary battery which is to be charged based on the electric power received by the power receiving unit,
wherein said electronic device is capable of sending an instruction to an outside to stop power transmission, and operates by a discharge current of the secondary battery,
wherein in a case where the secondary battery is charged and a voltage of the secondary battery becomes higher than a first threshold and lower than a second threshold which is larger than the first threshold, charging of the secondary battery is stopped without sending the instruction to stop the power transmission, and after an elapse of a predetermined period of time, the charging of the secondary battery is restarted, and
wherein when the voltage of the secondary battery thereafter becomes higher than the second threshold, the instruction to stop the power transmission is sent, and the charging of the secondary battery is stopped.

7. The electronic device charging system according to claim 6,
wherein the power transmitting unit comprises an electromagnetic coil.

8. The electronic device charging system according to claim 6,
wherein the charger receives a supply of electric power from an external commercial power supply.

9. A charging stop/restart method executed by an electronic device comprising: a power receiving unit which receives electric power, and a secondary battery which is to be charged based on the electric power received by the power receiving unit, wherein the electronic device is capable of sending an instruction to an outside to stop power transmission, and operates by a discharge current of the secondary battery,
said method comprising:
stopping charging of the secondary battery without sending the instruction to stop the power transmission in a case where the secondary battery is charged and a voltage of the secondary battery becomes higher than a first threshold and lower than a second threshold which is larger than the first threshold;
restarting the charging of the secondary battery after an elapse of a predetermined period of time; and
sending the instruction to stop the power transmission and stopping the charging of the secondary battery when the voltage of the secondary battery thereafter becomes higher than the second threshold.

* * * * *